Nov. 18, 1952   J. A. M. LECARME   2,618,447
CONTROL DEVICE FOR AIRCRAFT
Filed Feb. 6, 1947   3 Sheets-Sheet 1
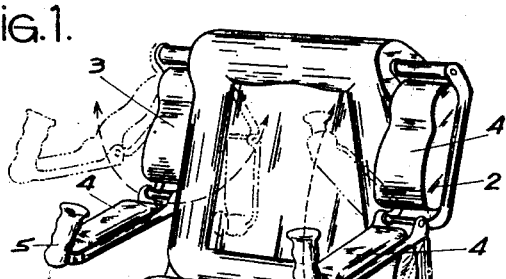
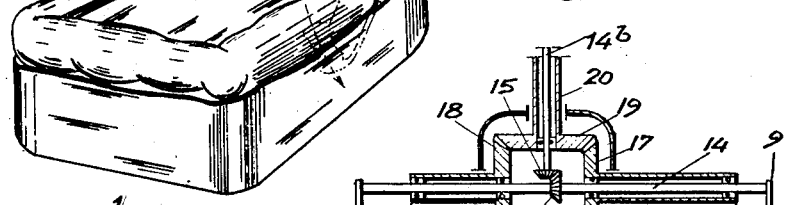
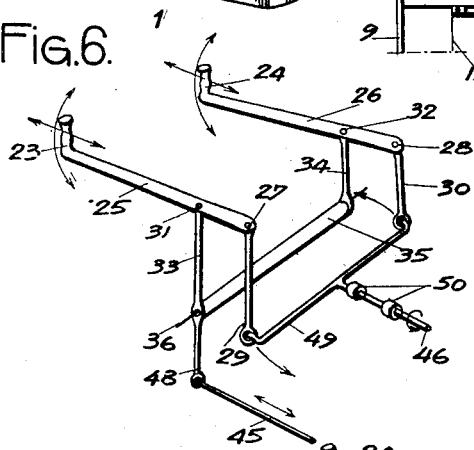
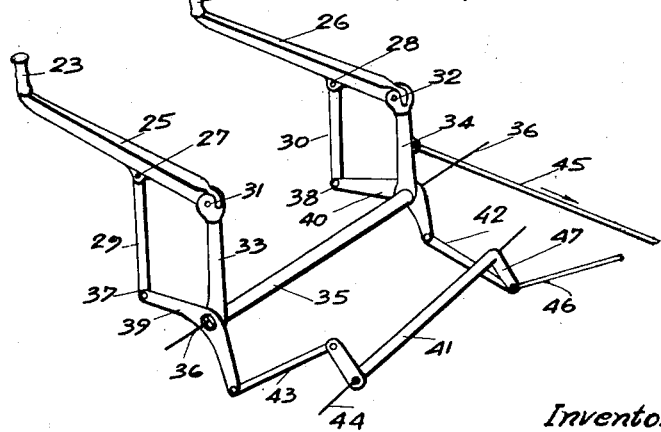
Inventor
JACQUES ANDRE MARIE LECARME
By Haseltine, Lake & Co.
Agents

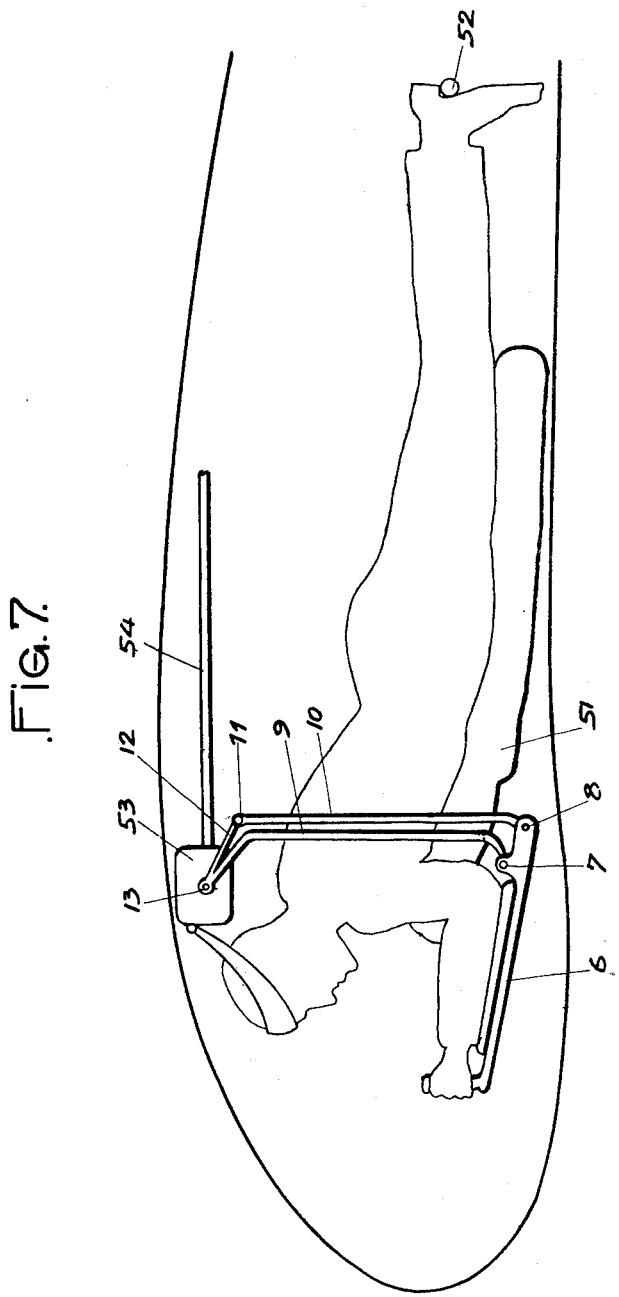

Patented Nov. 18, 1952

2,618,447

UNITED STATES PATENT OFFICE 2,618,447

CONTROL DEVICE FOR AIRCRAFT

Jacques André Marie Lecarme, Aix-en-Provence, France, assignor to Societe Anonyme dite: Societe Nationale de Constructions Aeronautiques du Sud-Est, Paris, France Application February 6, 1947, Serial No. 726,802
In France September 19, 1946

2 Claims. (Cl. 244—83)

As is well known, one of the problems encountered by aircraft designers lies in providing the controls in such a way that the piloting of an aircraft be effected with ease and the pilot be comfortably seated in the cockpit. It is essential for that purpose to group the controls in a small number of operating members whereof the displacements are judiciously interlinked to enable the piloting of the machine. Moreover, said control members must be so arranged as not to take up undue space in the cockpit and not to cramp the pilot, especially in the supervision he has to exert at each instant of a large number of apparatus grouped in front of him.

In order to reach the above objects, I have conceived an analyzing mechanism, comprising essentially a quadrilateral linkage system, the purpose of which is to analyze two controlling movements transmitted to it from a single element. Such mechanism has been described in my United States patent application Ser. Number 684,626 filed July 18, 1946 for "Mechanical Device with Conjugated Controls, Applicable in Particular to the Piloting of Aircraft."

However, the device described in said prior patent application responds successfully only to reflex movements in the piloting of a small aircraft. When applied to the control of large up-to-date craft, the operation thereof induces an undue amount of fatigue for the pilot. In fact, the piloting of a large modern aircraft invloves considerable effort. Anyhow, current dimensions in the largest up-to-date aircraft are so great that the muscular strength of the pilot no longer suffices to actuate the control surfaces and he necessarily has to be helped by the operation of servomotors. However, back from the time where aircrafts were of medium size, pilots have generally kept the habit of controlling high tonnage aircraft with both hands.

Moreover, said device did not yet entirely free the space in front of the pilot.

In the conventional method of two-hand control is the one the pilot uses the joy-stick and the hand-wheel, but said devices are particularly cumbersome. So it has already been attempted to replace them by a control system comprising two joy-sticks placed respectively at the right side and at the left side of the pilot. The movements of both sticks were interlinked by a mechanism in such a way that the movements of their actuating levers duplicated those movements which would have been produced with a single joy-stick having a hand-wheel at its end. Thus for instance, simultaneous forward and rearward movements of both joy-sticks would actuate the elevator, while opposed movements with one of the joy-sticks rising and the other one falling, would actuate the aileron control.

The main object of the invention is to provide an entirely different solution to the same problem, offering inter alia the advantage of enabling the pilot to rest his arms constantly throughout the duration of a flight.

Another object of the invention is to provide a control device for aircraft wherein both the elevator control and the aileron control are operated by means of a pair of handles carried by the arm rests of the pilot's seat so that the movements effected by said handles reproduce those which would be effected by the hands of a pilot having at his disposal a joy-stick to the end of which a hand-wheel is attached. In this way, the reflexes, or habitual responses, acquired by the pilot in the piloting of aircraft provided with a joy-stick and a hand-wheel can be useful. The movements of the handles are subsequently analyzed and transmitted to the control surfaces through a pair of symmetrically disposed linked mechanisms the articulations of which substantially duplicate those of a human arm, an intermediate device comprising a connecting tube, and a differential mechanism ensuring the interconnection of both said symmetrical mechanisms and the transfer of the analyzed movements to the control surfaces.

The ensuing disclosure made with reference to the appended drawings given by way of indication and not of limitation will clearly illustrate in what way the invention may be carried into effect.

In the drawings:

Figure 1 is a perspective view of the seat equipped with the device forming the subject matter of the invention.

Figure 4 is a schematic plan view partially in cross-section of the mechanism for interconnecting the analyzing devices according to one embodiment.

Figure 5 is a perspective view of another embodiment of the elements for transferring the controlling movements to the elevator and ailerons.

Figure 6 is a perspective view of a third embodiment of the elements for transferring the control movements to the elevator and ailerons.

Figure 7 schematically illustrates a different form of embodiment of the device according to the invention, this form of embodiment being applicable to a case where the pilot is lying flat on his face.

The pilot's seat according to the invention is in the form of an arm-chair 1 provided with hinged arm-rests 2 and 3, in which two pivotal connections substantially reproduce the articulations of a human arm at the shoulder and elbow respectively. Cushions or pads 4 are provided to receive the arms of the pilot and to furnish a comfortable support therefor. The end of each one of the hinged arm-rests carries a handle 5 designed to be gripped by the hand of the pilot.

Figure 2:
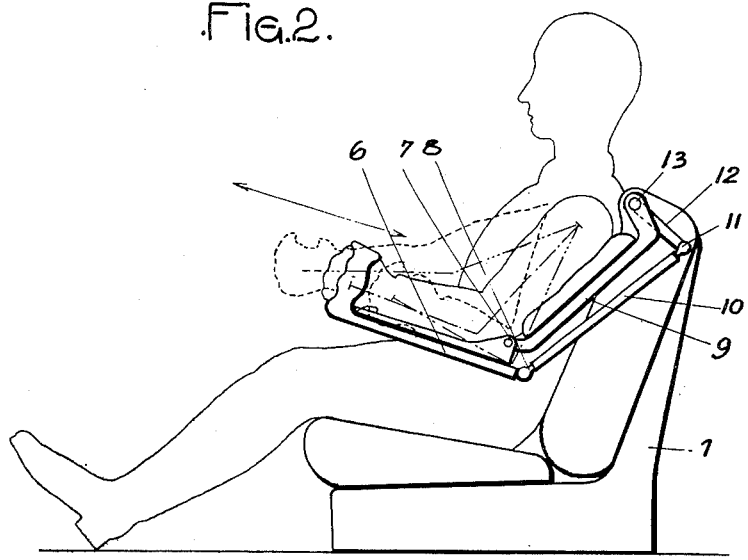
Figure 2 shows a diagrammatic side view of the seat and the control lever mechanism, in which the two end positions occupied by said levers during the control of the elevator have been illustrated.
Figure 3:
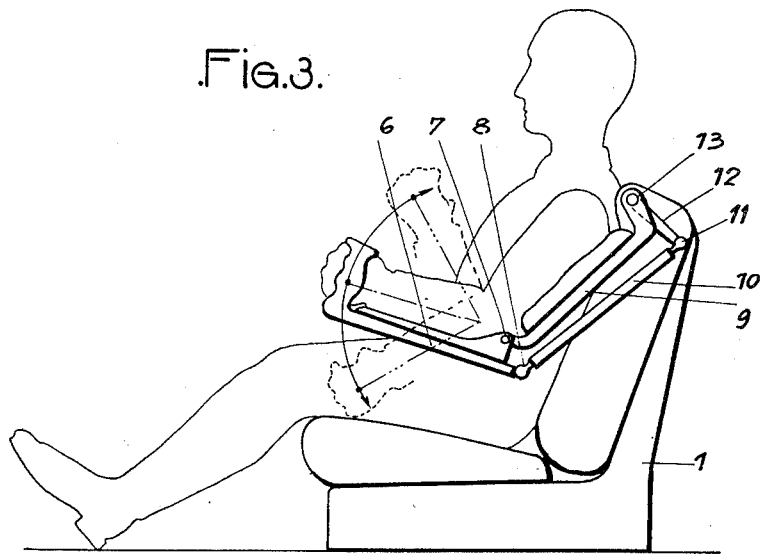
Figure 3 is a schematic side-view similar to Figure 2, but wherein the end positions occupied by the levers during the control of the ailerons have been illustrated.

Figures 2 and 3 diagrammatically illustrate the arrangement of the analyzing mechanism. The rod forming the fore-arm rest 6 is pivoted at two points 7 and 8 respectively to a lever 9 and a link 10. The link 10 is pivoted at 11 to a lever 12 which as well as the lever 9 is pivoted on the axis 13. The levers 9 and 12 and the link 10 duplicate the analyzing mechanism described in my prior United States patent application Ser. No. 684,626 filed July 18, 1946, for "Mechanical Device With Conjugated Controls, Applicable in Particular to the Piloting of Aircraft." Herein also their part is to analyze the movements of each handle according to two movements of rotation of the levers 9 and 12. Their construction is specifically designed with the purpose of, firstly, substantially duplicating the articulations of a human arm, and secondly, enabling the handles to reproduce the movements of an imaginary joy-stick and hand wheel system in such a way that the reflex-responses acquired by the pilot in aircraft provided with such a system remain usable in an aircraft equipped according to the invention. Thus, in particular, the length of the lever 12 should be greater than the spacing between the hinges 7 and 8 so that, in the forward and rearward movements corresponding to elevator control, the handles will travel along a path rather closely approaching a horizontal, as is the case for a small amplitude of movement of the end of a hand-wheel-carrying joy-stick.

Both symmetrically positioned levers 9 are rigidly coupled through the medium of a tube or bar 14 (Figure 4). A power take-off is effected on this tube by means of a bevel gearing 15—16. The rotation of the bar 14 is thus transferred to the bar 14b.

A differential gear system with three pinions 17, 18 and 19 on the contrary interconnects the symmetrically positioned levers 12 in such a way that said two links are only allowed to be rotated in reverse direction with respect to one another. The movement of the intermediate pinion 19 is transferred by the tube 20 to the aileron control.

In this way the flight control movements are made to emerge from the housing 22 containing the gears in the form of rotational movements of two co-axial tubes. So they may thence be conveyed upwardly or downwardly or rearwardly. Such grouping of the control movements is also advantageous when it is required to conduct them through air-tight partitions.

The controls being ensured by rotational movements, it is possible to provide a splined device making it possible to adjust the position of the pilot's seat in axial direction of the outgoing controls. Thus, if the controls go towards the rear, it is easy to provide for an aft-to-fore movement adapted to adjust the position of the seat with respect to the rudder bar according to the size of the pilot. In this case, adjustment of the height of the arm-rest will be obtained by a height adjustment of the seat of the arm-chair with respect to its back, which is rigid with the controls.

In the event of the controls going downwards or upwards, the back of the seat may be provided movable, so that its vertical adjustment will determine the position of the controlling arms. Adjustment of the position of the rudder-arm should then be provided for separately by a displacement of that member.

The apparatus described hereinabove operates as follows: The pilot sits down at the control station and rests his arms upon the arms of the control mechanism. When the pilot pulls both handles from the front to the rear or pushes them from the rear to the front, the levers 12 remain fixed and, the lever 9 and link 10 are rotated about the pivotal points 13 and 11. The fore-arm 6 assumes a succession of corresponding positions, the design of the levers being such that displacement of the handle may be effected substantially along a horizontal line as shown in Figure 2. Rotation of the levers 9 is transmitted, as described hereinabove, to the elevator plane.

When, on the contrary, the pilot bears downwards against one of the handles, while simultaneously raising the other, thus duplicating the movement of a pilot acting upon a hand-wheel control system, the levers 9 remain stationary. The fore-arms 6 are pivoted about the pivotal points 7, thus actuating, through the medium of the levers 10, the links 12 which rotate about the pivotal points 13 controlling, in their oppositely directed movements, the differential gear and causing rotation of the aileron control as indicated hereinabove.

The length of the arm 6 and also those of the levers 9 and the links 10 may be adjusted, through devices not shown in the drawing, so as to proportion said length to the size of the pilot's arms.

It will be seen from the foregoing description that the invention provides maximum comfort to the pilot while at the same time encumbering the cockpit to a minimum degree. The pilot retains entire visibility of the field of vision in front of him. The arrangement takes up less space than any other. No portion of the space near the pilot is masked to his sight, nor rendered inaccessible to his hands. Even the portion below the controlling arms may, apart from the very reduced volume which is swept by the controls in their successive positions, comprise auxiliary controls such as the various adjusting devices for the vertical position of the seat, trimming tabs or flaps, various control levers for actuating the fire extinguishers, starters or other equipment. It is simply necessary that the width of the cockpit enables the pilot to pass his arms out of the arm-rests of the pilot seat.

Moreover, the device according to the invention lends itself to forms of embodiment other than that described hereinabove. There are described hereinafter, by way of example, three different embodiments which will clearly illustrate the very general application for which the invention is adaptable.

Figures 5 and 6 illustrate two embodiments in which the analyzing system and the transmission devices are embodied by a system of levers and links.

In the embodiment illustrated in Fig. 5, the pilot acts upon the two handles 23 and 24 carried by the two arms 25 and 26 which are pivoted at 27 and 28 to the two links 29 and 30, and at 31 and 32, to the two levers 33 and 34 rigidly secured to the tube 35 pivoted about a bar 36 rigid with the frame-work of the aircraft. The links 29 and 30 are pivoted at 37 and 38 respectively to the bell crank levers 39 and 40 which are both pivoted about the bar 36. Said bell crank levers act in opposite directions upon the tube 41 through the medium of the links 42 and 43. The tube 41 is pivoted on a bar 44 which is fixed with respect to the frame-work of the aircraft. A bar 45 pivoted to the lever 34 is adapted to operate the elevator control, while a second bar 46 pivoted to a bell crank 47 rigid with the tube 41 is adapted to operate the aileron control.

The system operates as follows: When the pilot displaces both handles from front to rear or vice versa, the arms 33 and 34 rigid with the tube 35 are simultaneously rotated about the bar 36, and the bar 45 actuated by the lever 34 actuates the elevator control surface. When the pilot lowers the handle 24 and raises the handle 23 or vice versa, the levers 33 and 34 remain stationary, and it is the links 29 and 30 which, through the medium of the bell crank levers 39 and 40 and the links 42 and 43, are operative to actuate the tube 41 and through it the aileron control 46.

In the embodiment shown in Figure 6 the mechanism appears under a slightly different form which however is equivalent as to the result obtained. The arms 25 and 26, which herein also are hinged at 31 and 32 to the levers 33 and 34 rigid with the tube 35, are rearwardly extended as far as 27, 28, whereat they are pivoted to the links 29 and 30. Herein, however, the elevator control 45 is picked up from an extension of the lever 33. The links 29 and 30 act upon a bar 49 rigid with the aileron control take-off 46 which is journalled in bearings 50 rigid with the frame-work of the aircraft, and working under torsion stress.

The operation of the elevator control is the same as described in connection with Figure 5. As regards the aileron control, as the pilot raises one of the handles 23 and 24 while lowering the other one, the arms 25 and 26 rotate about the pivots 31 and 32 and their ends 27 and 28 actuate the links 29 and 30 which operate the bar 49 producing a torque which is transmitted to the aileron control through the bar 46 working under torsion.

Finally, Figure 7 illustrates the use of the device in connection with a machine of special design wherein the pilot is lying supine. The pilot rests upon a mattress 51. With his foot, he actuates the rudder control 52 in the conventional manner. The device according to the invention is the one described above in connection with Figures 2 and 3. The same reference numerals designate similar elements. In this figure, there is diagrammatically represented at 53 the differential system and at 54 the outgoing controls which are similar to those described in connection with Figure 4.

The present invention further contemplates the new articles of manufacture formed by apparatus or elements of apparatus making use of the above described devices.

What I claim as my invention and desire to secure by Letters Patent is:

1. In a control device for flying machines having at least an elevator and ailerons, in combination, an elevator control, an aileron control, a body-support for the pilot, two main control arms of equal length, parallel for any position of the elevator control when the aileron control is in a neutral position, said main control arms being movable by substantially parallel displacements in planes parallel to the longitudinal plane of symmetry of the machine on each side of said body-support and rotatable about axes perpendicular to said plane of symmetry said arms further providing rests for the pilot's fore-arms, handles fixed to the forward ends of said control arms in a position to be gripped by the pilot's hands, two equal linked quadrangles respectively located in planes parallel to said plane of symmetry and comprising two first levers respectively articulated at one of their ends on the rear ends of said control arms, one at least of said levers being connected with said elevator control, a rotatable tubular member perpendicular to said plane of symmetry and rigidly fitted on the other ends of said first levers, two links respectively articulated on intermediate points of said control arms and two bell-crank levers centrally articulated on said tubular member and having one of their ends articulated on the free ends of said links, a tube parallel to said tubular member, two second levers respectively fitted on said tube, said second levers being directed in opposite direction, two second links for connecting respectively the free ends of said bell-crank levers with said second levers and an operating lever secured on said tube and connected with said aileron control.

2. In a control device for flying machines having at least an elevator and ailerons, in combination, an elevator control, an aileron control, a body-support for the pilot, two main control arms of equal length, parallel for any position of the elevator control when the aileron control is in a neutral position, said main control arms being movable by substantially parallel displacements in planes parallel to the longitudinal plane of symmetry of the machine on each side of said body-support and rotatable about axes perpendicular to said plane of symmetry, said arms further providing rests for the pilot's fore-arms, handles fixed to the forward ends of said control arms in a position to be gripped by the pilot's hands, two equal linked parallelograms respectively located in planes parallel to said plane of symmetry and comprising two first levers respectively articulated at one of their ends on the rear ends of said control arms, one at least of said levers being connected with said elevator control, a rotatable tubular member perpendicular to said plane of symmetry and rigidly fitted on the other ends of said first levers, two links respectively articulated on intermediate points of said control arms and two bell-crank levers centrally articulated on said tubular member and having one of their ends articulated on the free ends of said links, a tube parallel to said tubular member, two second levers respectively fitted on said tube, said second levers being directed in opposite directions, two second links for connecting respectively the free ends of said bell-crank levers with said second levers and an operating lever secured on said tube and connected with said aileron control.

JACQUES ANDRÉ MARIE LECARME.

REFERENCES CITED

The following references are of record in the file of this patent:

UNITED STATES PATENTS

| Number | Name | Date |
|---|---|---|
| 1,061,917 | Malterner | May 13, 1913 |
| 1,085,575 | Curtiss | Jan. 27, 1914 |
| 1,536,515 | Methlin | May 5, 1925 |
| 1,880,138 | Hubl | Sept. 27, 1932 |

FOREIGN PATENTS

| Number | Country | Date |
|---|---|---|
| 25,726 | Great Britain | 1909 |